United States Patent [19]

Rudolph

[11] 4,031,030

[45] June 21, 1977

[54] PROCESS FOR TREATING RAW GAS PRODUCED BY THE PRESSURE GASIFICATION OF COAL

[75] Inventor: Paul Rudolph, Bad Homburg, Germany

[73] Assignee: Metallgesellschaft Aktiengesellschaft, Frankfurt am Main, Germany

[22] Filed: Mar. 10, 1976

[21] Appl. No.: 665,670

[30] Foreign Application Priority Data

Sept. 20, 1975 Germany .......................... 2542055

[52] U.S. Cl. ................................ 252/373; 48/202; 48/206; 48/210; 261/151; 261/152
[51] Int. Cl.² ...................... C10K 1/06; C01B 2/02
[58] Field of Search ........ 48/202, 206, 210, 197 R; 252/373; 261/151, 152, 17

[56] References Cited

UNITED STATES PATENTS

| | | | |
|---|---|---|---|
| 1,083,885 | 1/1914 | Lloyd | 261/151 |
| 3,427,253 | 2/1969 | Becker-Boost et al. | 48/206 |
| 3,540,867 | 11/1970 | Baron et al. | 48/206 |
| 3,692,506 | 9/1972 | Johnson | 48/210 |

*Primary Examiner*—Robert L. Lindsay, Jr.
*Assistant Examiner*—George C. Yeung
*Attorney, Agent, or Firm*—Burgess, Dinklage & Sprung

[57] ABSTRACT

Process for treating raw gas produced by the gasification of coal under elevated pressures and temperatures by a treatment with oxygen and steam and, if desired, additional gasifying agents such as carbon dioxide. The raw gas leaving the gas producer is cooled in a first condensing stage to a temperature which is in the range of 150°–220° C and 3°–25° C below the dew point temperature of the raw gas. The resulting condensate is withdrawn and the raw gas is conducted through at least one additional condensing stage. The condensate of the first condensing stage is treated independently of the condensate from the further stage or stages.

8 Claims, 1 Drawing Figure

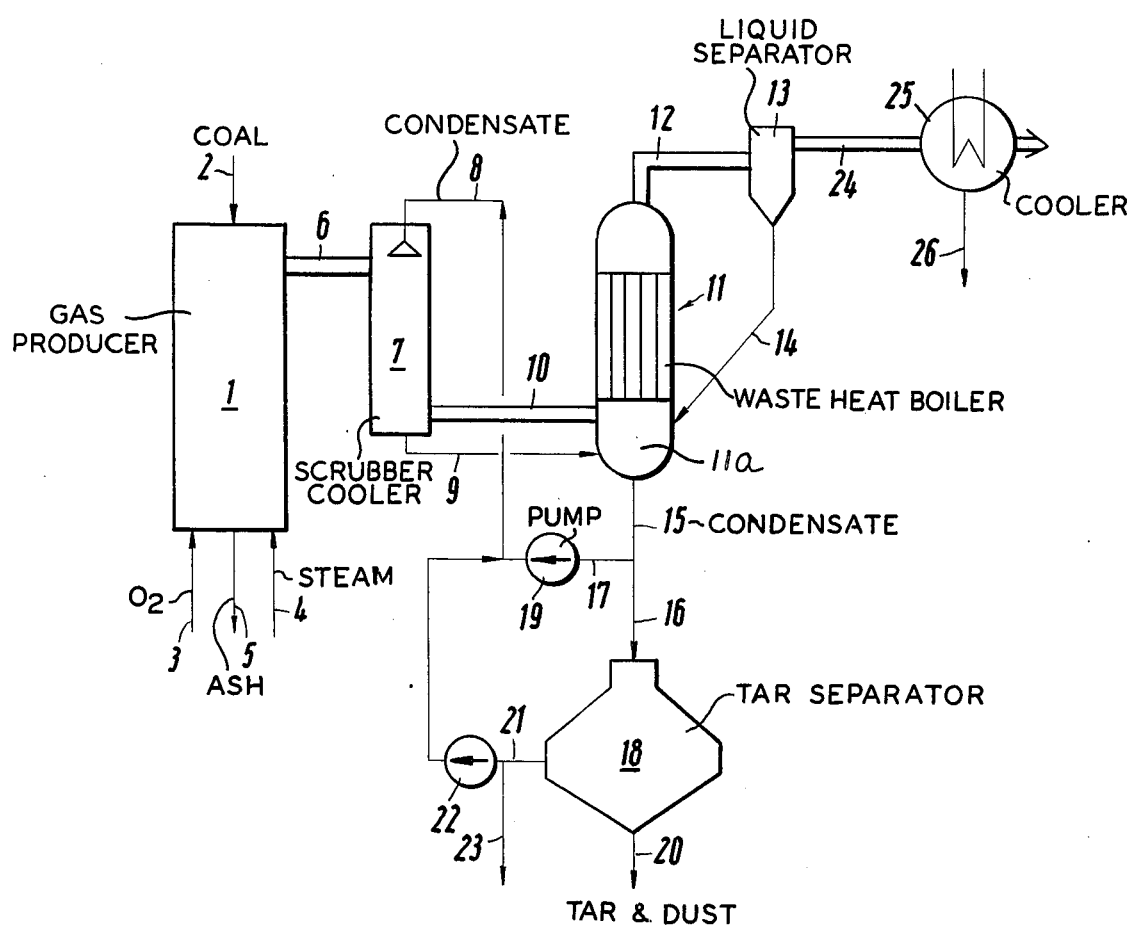

PROCESS FOR TREATING RAW GAS PRODUCED BY THE PRESSURE GASIFICATION OF COAL

BACKGROUND

This invention relates to a process for treating raw gas producted by the gasification of coal under superatmospheric pressure and at elevated temperatures by a treatment with oxygen and water vapor and, if desired, additional gasifying agents. Such additional gasifying agent is, e.g., carbon dioxide.

It is known that raw gas produced by a pressure gasification of coal can be freed from dust and condensible constituents by scrubbing and cooling. The purified gas can then be converted into synthesis gas. This necessitates also a desulfurization to avoid a deterioration of catalysts.

Reactors for a gasification of coal under pressure with oxygen and water vapor, so-called gas generators, are known, e.g., from German Pat. No. 1,021,116 and U.S. Pat. No. 2,667,409.

SUMMARY

The process of the invention subjects the hot raw gas leaving the gas generator to such further processing that disturbing substances are optimally removed from the gas and any condensate which becomes available can be processed further at reasonable cost.

This is accomplished in that the raw gas leaving the gas producer is cooled in a first condensing stage to a temperature which is in the range of 150°–220°C and 3°–25° C below the dew point temperature of the raw gas, the resulting condensate is withdrawn, the raw gas is conducted through at least one additional condensing stage, and the condensate of the first condensing stage is treated independently of the condensate of the further stage or stages.

DESCRIPTION OF THE DRAWING

The accompanying drawing is a flow diagram with appropriate descripture legends of the process of the invention.

DESCRIPTION

The cooling to a predetermined temperature in the first condensing stage results in a condensate which contain a highly predominant part of the salts which are to be removed from the raw gas by scrubbing and condensing. These salts disturb the processing of the condensate and increase the costs of recovering cooling water. Because the further condensing stages contain salts only in a very low concentration, the condensate produced therein can be processed without difficulty and used as a source of cooling water for the over-all process. The condensate produced at a relatively low rate in the first condensing stage is separately processed further and fed, e.g., to a thickener and is not used for a recovery of cooling water.

In the first condensing stage the raw gas is first cooled by a direct heat exchange and saturated with water vapor. This is succeeded by an indirect heat exchange, which results in a temperature drop below the dew point temperature of the raw gas. The direct heat exchange is usually effected in a scrubber-cooler, in which the raw gas is cooled to a temperature in the range of 170°–220° C. This scrubber-cooler is succeeded by a waste heat boiler for the indirect heat exchange.

Owing to the temperature maintained in the first condensing stage, the condensate produced therein contains not only salts but also polyhydric phenols if contained in the raw gas. This is an additional advantage because the means for dephenolizing the condensate which is subsequently produced in further cooling and condensing stages are thus relieved.

An example of the processing of raw gas in accordance with the invention will be explained with reference to the drawing.

In a gas producer 1, known per se, which comprises a coal inlet 2, an oxygen conduit 3 and a water vapor inlet 4, coal is gasified under a pressure of 5–120 atmospheres, preferably 10–80 atmospheres. Ash is withdrawn through conduit 5.

The raw gas produced by the gasification reaction leaves the gas producer 1 through conduit 6 at a temperature in the range of 400°–800° C. The main constituents of this raw gas are carbon oxides, hydrogen, methane and higher hydrocarbons, tar vapor, water vapor, dust, phenols, sulfur compounds and salts, such as halogen compounds, particularly chlorides and fluorides. In the scrubber-cooler 7, condensate from conduit 8 is sprayed into the raw gas, which is thus cooled to temperatures of 170°–220° C and saturated with water vapor. Condensate consisting mainly of condensed steam flows via line 8 through the scrubber-cooler 7 at a rate of 1–8 kg per kg of raw gas.

The dust- and tar-containing condensate collected in the sump of the scrubber-cooler is withdrawn in conduit 9. The raw gas cooled by a direct heat exchange flows in conduit 10 to a waste heat boiler 11 and is indirectly cooled therein. The inlet and outlet conduits for the coolant, usually water, have been ommited in the drawing for the sake of clarity. The heat extracted from the raw gas is used, e.g., to generate steam.

Raw gas at 150°–217° C flows from waste heat boiler 11 into conduit 12. This temperature is adjusted to be 3°–25° C below the dew point temperature of the raw gas which leaves the gas producer in conduit 6. As a result, condensate becomes available only at a relatively low rate in the sump 11a of the waste heat boiler. Additional condensate is removed in the liquid separator 13 from the raw gas flowing in conduit 12 and is drained through conduit 14. Conduit 9 leads also to the sump 11a.

The condensate which has collected in sump 11a is withdrawn in conduit 15, which branches into conduits 16 and 17. Conduit 16 conducts a partial stream of the condensate to a tar separator 18. The partial stream in conduit 17 is fed to conduit 8 by means of pump 19 and is returned into scrubber-cooler 7. Tar and dust are withdrawn from the tar separator through conduit 20. The condensate which is substantially free from tar and dust leaves the tar separator through conduit 21.

The raw gas leaving the first condensing stage through conduit 24 is fed to at least one additional cooler 25, which is shown in the drawing in a simplified manner as a heat exchanger. In practice, the heat exchanger is often succeeded by another cooling and condensing stage, which is not shown. The condensate which is produced in the cooler 25 and any succeeding additional cooler (conduit 26) is collected and jointly fed to a dephenolizing plant, which is known per se and not shown. The condensed steam which has thus been treated may be re-used as cooling water for cooling the raw gas.

A partial stream of the condensate flowing in conduit 21 is fed by the pump 22 and admixed to the recirculated condensate from conduits 17 and 8. The condensate flowing in conduit 21 consists mainly of condensed steam and contains about 85–95% of the salts contained in the raw gas produced by gasification, also about 50–70% of the polyhydric phenols contained in the raw gas. Most of the salts are halogen compounds, such as chlorides and fluorides. A partial stream of the condensed steam flowing in conduit 21 is withdrawn in conduit 23 and fed to a separate processing unit, e.g, a thickener.

This salt-containing water from the first condensing stage is not suitable for being dephenolized and being transformed into cooling water. On the other hand, the raw gas is cooled to a relatively high temperature so that salt-containing condensed steam must be withdrawn from the raw gas-processing system only at a relatively low rate and for this reason the separate handling of this water and the fact that its processing and re-use are restricted do not constitute a serious disadvantage. This disadvantage is more than offset by the advantage which resides in that almost all disturbing salts are contained in the water from the first condensing stage and cannot become available at a substantial rate in the further stages for cooling and condensing the raw gas.

EXAMPLE

In a gas generator 1, coal at a rate of 38,000 kg (calculated as water- and ash-free coal) per hour is gasified under a pressure of 30 atmospheres by a treatment with 10,000 standard m³/h oxygen and 60,000 kg/h water vapor. The resulting raw gas at 450° C contains dry gas, which is produced at a rate of 75,000 standard m³/h. The dry gas has the following composition in percent by volume:

$CO_2$ — 28
CO — 21
$H_2$ — 39
$CH_4$ — 11
$N_2$ — 1

The raw gas produced per hour contains also 40,000 kg water vapor, 9.2 chlorides, 4.1 kg fluorides, 210 kg monohydric phenols and 90 kg polyhydric phenols, as well as tar, oils, fatty acids, and ammonia. The dew point temperature of the raw gas is 184° C.

In a scrubber-cooler 7, the raw gas is intensely scrubbed with 4 kg condensed steam per kg of raw gas. Raw gas which is saturated with water vapor leaves the scrubber cooler at a temperature of 184° C. The raw gas is indirectly cooled to 180° C in the succeeding waste heat boiler. The resulting condensate together with the liquid from the scrubber-cooler are partly returned to the scrubber-cooler and partly fed to a tar separator.

Aqueous condensate is withdrawn from the tar separator in conduit 21. Part of said condensate, at a rate of 5000 kg per hour, is fed through conduit 23 to a thickener. This aqueous condensate contains 8.7 kg chlorides, 3.9 kg fluorides, 33 kg monohydric phenols, and 50 kg polyhydric phenols.

The raw gas in conduit 24 is conducted through two additional cooling and condensing stages, in which additional aqueous condensate is produced at a rate of 34,900 kg/h and is collected and processed separately from the condensate from the first condensing stage. The additional aqueous condensate contains only 0.5 kg/h chlorides and 0.2 kg/h fluorides and also contains 40 kg/h polyhydric phenols and 177 kg/h monohydric phenols. Owing to its low salt content, this condensate can easily be purified and processed for re-use as cooling water in the process.

What is claimed is:

1. In a process for treating raw gas produced by the gasification of coal with oxygen and water vapor under a pressure of 5–120 atmospheres and elevated temperatures, said raw gas leaving said gasification at a temperature in the range of 400°–800° C, in a first condensing stage cooling said raw gas to a temperature in the range of 150°–220° C and to 3°–25° C below its dew point, said first condensing stage including a scrubbing and cooling zone for spraying condensate into said raw gas, withdrawing condensate from said first condensing stage and removing tar and dust from said condensate in a separation zone, recylcing condensate substantially free of dust and/or tar from said separation zone to said scrubbing and cooling zone, conducting the raw gas from said first condensing stage directly to a second condensing stage, withdrawing condensate from said second condensing stage and dephenolizing and purifying it separately from the condensate from the first condensing stage, said dephenolized and purified condensate from the second condensing stage containing a lower amount of salts than the condensate recycled to the scrubbing and cooling zone.

2. Process of claim 1 wherein in the first condensing stage the raw gas is first cooled by a direct heat exchange in a scrubber-cooler and is then cooled by an indirect heat exchange in a waste heat boiler.

3. Process of claim 2 wherein the raw gas leaves the scrubber-cooler at a temperature in the range of 170°–220° C and leaves the waste heat boiler at a temperature of 150°–217° C.

4. Process of claim 2 wherein 1–8 kg water per kg of raw gas is sprayed in the scrubber cooler into the raw gas.

5. Process of claim 2 wherein a partial stream of the condensate produced in the waste heat boiler is fed to the scrubber-cooler.

6. Process of claim 2 wherein condensate from the scrubber-cooler is fed to the waste heat boiler.

7. Process of claim 1 wherein a partial stream of condensate from the first condensing stage, which condensate contains salts and/or polyhydric phenols and has been freed from dust and/or tar, is withdrawn from the process.

8. Process of claim 1, wherein the dephenolized and purified condensate from the second condensing stage is used as cooling water in the process.

* * * * *